US012771959B2

(12) United States Patent
Laiho et al.

(10) Patent No.: US 12,771,959 B2
(45) Date of Patent: Oct. 20, 2026

(54) SENSOR EVENT GENERATION CIRCUIT

(71) Applicant: Kovilta Oy, Turku (FI)

(72) Inventors: Mika Laiho, Vantaa (FI); Mika Grönroos, Turku (FI); Ari Paasio, Littoinen (FI)

(73) Assignee: Kovilta Oy, Turku (FI)

( * ) Notice: Subject to any disclaimer, the term of this patent is extended or adjusted under 35 U.S.C. 154(b) by 0 days.

(21) Appl. No.: 19/133,104

(22) PCT Filed: Nov. 27, 2023

(86) PCT No.: PCT/FI2023/050646
§ 371 (c)(1),
(2) Date: May 27, 2025

(87) PCT Pub. No.: WO2024/115811
PCT Pub. Date: Jun. 6, 2024

(65) Prior Publication Data

US 2026/0189812 A1 Jul. 2, 2026

(30) Foreign Application Priority Data

Nov. 29, 2022 (EP) .................................... 22210284

(51) Int. Cl.
*H04N 25/47* (2023.01)
*H04N 25/60* (2023.01)
*H04N 25/78* (2023.01)

(52) U.S. Cl.
CPC ............. *H04N 25/47* (2023.01); *H04N 25/60* (2023.01); *H04N 25/78* (2023.01)

(58) Field of Classification Search
None
See application file for complete search history.

(56) References Cited

U.S. PATENT DOCUMENTS

| | | | | |
|---|---|---|---|---|
| 11,936,996 | B2 * | 3/2024 | Niwa | H04N 25/47 |
| 2010/0182468 | A1 * | 7/2010 | Posch | H04N 25/00 348/294 |
| 2014/0368703 | A1 * | 12/2014 | Yao | H04N 25/768 348/295 |
| 2015/0281613 | A1 * | 10/2015 | Vogelsang | H04N 25/57 348/300 |
| 2017/0059399 | A1 * | 3/2017 | Suh | G01J 1/42 |
| 2019/0123759 | A1 * | 4/2019 | Kumar | H03M 1/38 |
| 2020/0068156 | A1 * | 2/2020 | Ma | H04N 25/57 |
| 2020/0129138 | A1 * | 4/2020 | Iwakiri | A61B 6/4283 |
| 2022/0132054 | A1 | 4/2022 | Zhu et al. | |
| 2025/0211867 | A1 * | 6/2025 | Zannoni | H04N 25/47 |

FOREIGN PATENT DOCUMENTS

EP 3930312 A1 12/2021

OTHER PUBLICATIONS

The Extended European Search Report, Application No. 22210284.0, dated Mar. 23, 2023.
International Search Report and Written Opinion, Application No. PCT/FI2023/050646, dated Jan. 29, 2024.

* cited by examiner

*Primary Examiner* — Quan Pham
(74) *Attorney, Agent, or Firm* — MacMillan, Sobanski & Todd, LLC

(57) ABSTRACT

The present invention provides a sensor event generation circuit (100) for detecting changes and producing change events based on changing sensor signals as well as converting sensor signals to digital signals.

14 Claims, 5 Drawing Sheets

SENSOR EVENT GENERATION CIRCUIT

CROSS-REFERENCE TO RELATED APPLICATIONS

This is a national phase application of international application PCT/FI2023/050646, filed on Nov. 27, 2023, and claims the benefit of European Application No. 22210284.0, filed on Nov. 29, 2022, each of which is incorporated by reference in the entirety.

TECHNICAL FIELD OF THE INVENTION

The present invention relates to a sensor event generation circuit according to the preamble of the appended independent claim. The invention also relates to a sensor event generation system comprising a plurality of such circuits.

BACKGROUND OF THE INVENTION

Changes in a sensor signal can be monitored by storing a reference sensor output signal and comparing the latest stored reference signal to an instantaneous sensor output. If the instantaneous sensor output differs from the latest stored reference signal by more than a predetermined threshold value, then the instantaneous sensor output signal is stored as a new reference signal, and a “change event” is generated that indicates the change in the sensor signal. Monitoring only the change events allows to significantly reduce the amount of data that needs to be read out of the sensor when changes in the instantaneous sensor signal are infrequent. In many cases it is also important to produce a full range digital sensor output reading (multi-bit digital sensor value) in addition to just the change event output. An example where sensors accompanied with a change detection circuitry are currently used is image sensors, where in many applications fast reaction to changes in the visual stimuli is needed. The use of change detection sensing is not, however, limited to imagers, but could also be applied to any sensor data which changes over time, such as tactile, sound, radio frequency, olfactory or proximity sensors.

Conventional temporal event cameras have an in-pixel change detection circuitry, where the thresholds of comparators needed to detect change between stored and instantaneous values vary highly between pixels due to statistical manufacturing variation. Therefore, the produced event data tends to be noisy and non-uniform, and a full-scale digital image that is in sync with the events is difficult to obtain. Also, by placing the change comparators into each pixel causes the pixel area to become relatively large. The area challenge can be mitigated by using semiconductor fabrication technology harnessing 3D integration, but the rest of the challenges of the conventional approach remain.

Document US 2019/0052820 A1 presents an event generating imager system that stores a previous pixel value (stored reference signal) within the pixel and evaluates the difference of the previously stored pixel value to the instantaneous value (instantaneous sensor output). The evaluation of the difference is carried out outside the pixel array by comparators. Moreover, there are as many comparators as there are columns in the pixel array. The reference signal storage in this system is non-quantized; if the peripheral comparator system detects a change above a predetermined threshold, the instantaneous pixel value is sampled to the pixel reference storage capacitor as a new stored reference signal. This sensor does not output a multi-bit digital sensor value.

Document WO 2021/260102 A1 presents an event generating imager system, where the instantaneous value of the pixel is first converted into digital form with a full dynamic range analog-to-digital converter (ADC) and after that the instantaneous value in digital form is compared with a digital comparator to a stored value (stored in the pixel in digital form) representing the previous pixel value at the previous pixel event, to determine, whether the pixel value has changed by more than a certain threshold. In this prior art one needs to support a full dynamic range ADC as well as a digital comparator and adder, accompanied with an in-pixel stored value memory, resulting in a highly complex pixel circuitry. Large pixel arrays can only be realized with expensive high-end, preferably 3D stacked fabrication processes.

OBJECTIVES OF THE INVENTION

It is the main objective of the present invention to reduce or even eliminate the prior art problems presented above.

It is an objective of the present invention to provide a sensor event generation circuit. In more detail, it is an objective of the invention to provide a sensor event generation circuit enabling to obtain both event and quantized full-scale image information. It is a further objective of the invention to provide a sensor event generation circuit enabling to obtain a full-scale digital image that is in sync with the events. It is yet a further objective of the invention to provide a sensor event generation circuit enabling to produce event data that is low noise and has high uniformity.

In order to realise the above-mentioned objectives, the sensor event generation circuit according to the invention is characterised by what is presented in the characterising portion of the appended independent claim. Advantageous embodiments of the invention are described in the dependent claims.

SUMMARY OF THE INVENTION

According to a first aspect of the invention there is provided a sensor event generation circuit that comprises:

- a first sensor circuit arranged to provide a first electrical analog signal, and a first switch connected to the first sensor circuit and arranged to receive the first electrical analog signal,
- a second sensor circuit arranged to provide a second electrical analog signal, and a second switch connected to the second sensor circuit and arranged to receive the second electrical analog signal,
- a selection control circuit arranged to control the operation of the first switch and the second switch so that only one of the first and second switches can be in a closed state at a time,
- a state value digital memory having a first digital state memory for storing a first digital state value and a second digital state memory for storing a second digital state value, wherein the selection control circuit is arranged to control the state value digital memory to select the first digital state memory when the first switch is in the closed state or the second digital state memory when the second switch is in the closed state,
- a digital-to-analog converter connected to the state value digital memory and arranged to receive the digital state value stored in the selected digital state memory and to convert the digital state value to a previous state analog value, an analog-to-digital converter connected to the first switch, the second switch and the digital-to-analog converter and arranged to receive the previous state analog value and one of the electrical analog signals and to convert the difference of the electrical analog signal and the previous state analog value to a difference digital value, an event indication circuit connected to the analog-to-digital converter and arranged to receive the difference digital value and to determine whether the difference digital value is above a positive threshold and in such case assert a positive event indication signal, and to determine whether the difference digital value is below a negative threshold and in such case assert a negative event indication signal, an event presence circuit connected to the event indication circuit and arranged to assert an event presence signal if either the positive event indication signal or the negative event indication signal has been received, and a summing circuit connected to the analog-to-digital circuit and the state value digital memory and arranged to receive the difference digital value and the digital state value stored in the selected digital state memory, to sum the difference digital value with the digital state value and to produce a summing result, wherein the summing result is arranged to be written to the selected digital state memory if the event presence signal has been asserted.

According to an embodiment of the invention the sensor event generation circuit comprises:

a third sensor circuit arranged to provide a third electrical analog signal, and a third switch connected to the third sensor circuit and arranged to receive the third electrical analog signal, a fourth sensor circuit arranged to provide a fourth electrical analog signal, and a fourth switch connected to the fourth sensor circuit and arranged to receive the fourth electrical analog signal, a fifth switch connected between the first and second switches and the ana-log-to-digital converter, and a sixth switch connected between the third and fourth switches and the ana-log-to-digital converter, wherein the selection control circuit is arranged to control the operation of the third switch and the fourth switch so that only one of the third and fourth switches can be in a closed state at a time, and to control the operation of the fifth switch and the sixth switch so that only one of the fifth and sixth switches can be in a closed state at a time and wherein the state value digital memory has a third digital state memory for storing a third digital state value and a fourth digital state memory for storing a fourth digital state value, wherein the selection control circuit is arranged to control the state value digital memory to select the first digital state memory when the first switch and the fifth switch are in the closed state, the second digital state memory when the second switch and the fifth switch are in the closed state, the third digital state memory when the third switch and the sixth switch are in the closed state, or the fourth digital state memory when the fourth switch and the sixth switch are in the closed state.

According to an embodiment of the invention the sensor event generation circuit comprises output means for outputting one or more of the following: the digital state value, the difference digital value, the positive event indication signal, the negative event indication signal, the event presence signal, or the summing result.

According to an embodiment of the invention the analog-to-digital converter is a thermometer analog-to-digital converter.

According to an embodiment of the invention the positive and negative thresholds are defined in terms of number of least significant bits, which are adjustable.

According to an embodiment of the invention each of the sensor circuits comprises a sensor element or is connected to a sensor element.

According to an embodiment of the invention the sensor element is a photodiode.

According to an embodiment of the invention the sensor circuit comprises a regulating transistor and an inverting amplifier, wherein the source of the regulating transistor is connected to the cathode of the photodiode and the input of the inverting amplifier, the drain of the regulating transistor is connected to an operating voltage and the gate of the regulating transistor is connected to the output of the inverting amplifier, wherein the inverting amplifier is arranged to produce essentially a logarithmic output.

According to an embodiment of the invention the sensor circuit comprises a regulating transistor and an inverting amplifier, wherein the source of the regulating transistor is connected to the anode of the photodiode and the input of the inverting amplifier, the drain of the regulating transistor is connected to an operating voltage and the gate of the regulating transistor is connected to the output of the inverting amplifier, wherein the inverting amplifier is arranged to produce essentially a logarithmic output.

According to an embodiment of the invention the sensor event generation circuit has been manufactured using 3D integration technology, wherein the building blocks of the sensor event generation circuit are physically located in a least two semiconductor substrates.

According to an embodiment of the invention the analog-to-digital converter uses an unsampled electrical analog signal value as the input to the analog-to-digital converter.

According to a second aspect of the invention there is provided a sensor event generation system that comprises at least two sensor event generation circuits according to the invention.

According to an embodiment of the invention the digital-to-analog converters in the at least two sensor event generation circuits are arranged to use shared analog references.

According to an embodiment of the invention the digital-to-analog converters in the at least two sensor event generation circuits are arranged to use analog references that are arranged to counteract periodic global changes in an ambient sensor signal.

An advantage of the sensor event generation circuit according to the invention is that it enables to obtain both event and quantized full-scale image information. Another advantage of the sensor event generation circuit according to the invention is that it enables to obtain a full-scale digital image that is in sync with the events. Yet another advantage of the sensor event generation circuit according to the invention is that it produces event data that is low noise and has high uniformity.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS OF THE INVENTION

Figure 1:
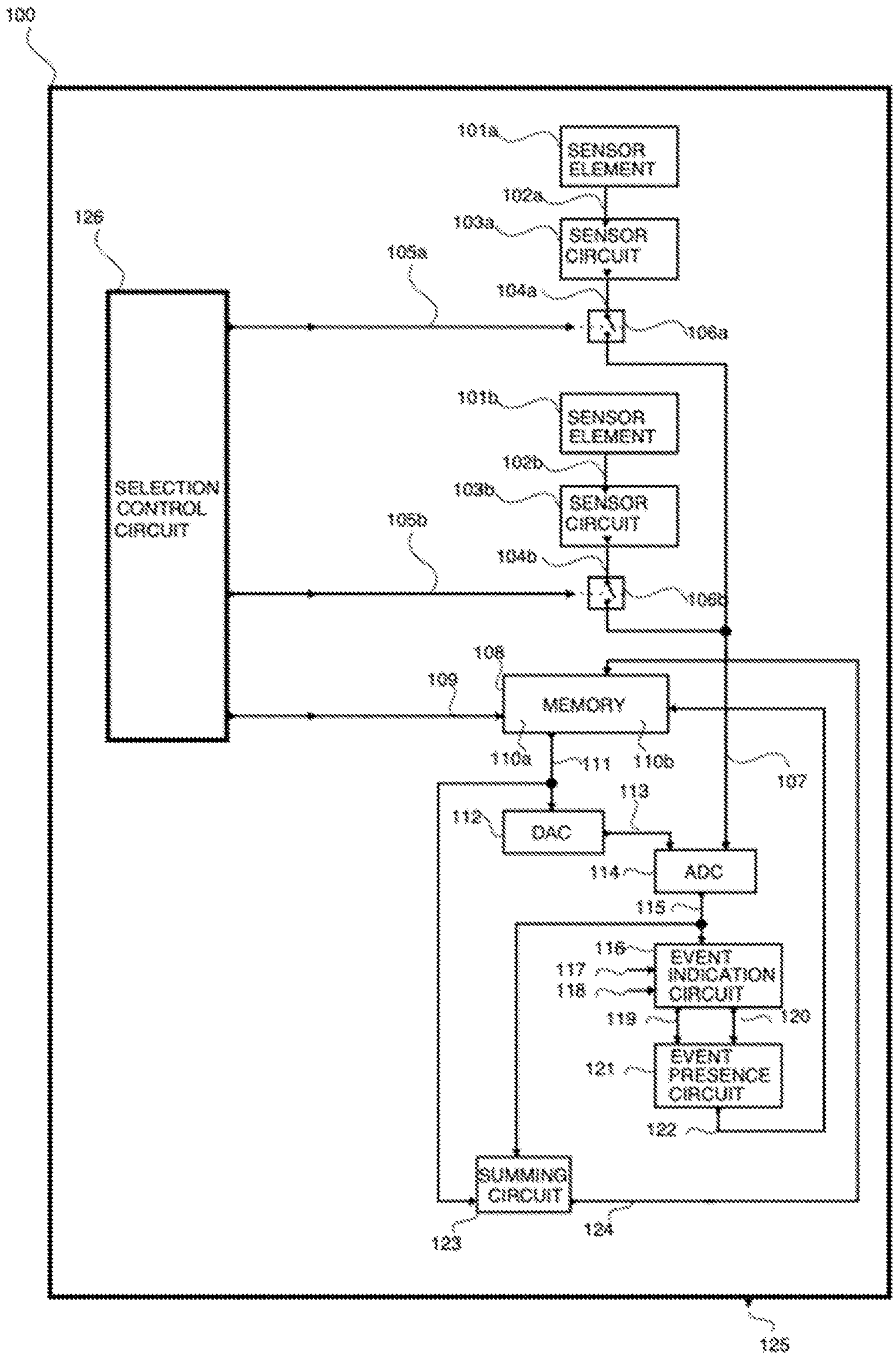
FIG. 1 illustrates a sensor event generation circuit according to a first embodiment of the invention.

In order to obtain both event and quantized full-scale information from the same process, new means to quantize and store the pixel data is introduced in this disclosure. Although much of the disclosure uses a photodiode as an example of the sensory input and a pixel as the basic unit of a 2D sensor array, different sensors or combinations of different sensors can be used, for example, tactile, sound, radio frequency, olfactory, and proximity sensors.

The key feature of the present invention is to compare the instantaneous pixel value to a reference level selected from a set of global comparator reference levels, in-stead of having comparators monitoring pixelwise changes against a non-quantized stored value representing the pixel value at the time of the previous event from the pixel. The quantized levels for each pixel are stored and updated based on the event history either within the pixel or outside the pixel. These quantized levels directly represent the grayscale values for the pixels. The stored reference values can be in analog or digital form as long as they are quantized to a set of fixed levels. However, if fast and reliable digital pixel value transmission or subsequent digital processing is to be applied, a digital storage is preferred.

In the case of traditional 2D CMOS fabrication technology, it is beneficial to place the reference storage and the comparison circuitry outside the pixel area. Typically, a multitude of comparators is implemented, e.g., one comparator per pixel column, and a full row of instantaneous pixel values can be compared at the same time to their corresponding previous values. The number of comparators can be more or less than the number of pixel columns depending on the evaluation speed requirements, but typically in meaningfully large pixel arrays, it is not area efficient to have one comparator per pixel in a monolithic 2D integrated circuit technology. 3D integration technology opens up the possibility for a per-pixel comparator, however, the chip wide routing of the quantization levels remains challenging even in the 3D integration case.

In the present invention, an individual sensor (pixel) is only accompanied with sensing circuitry, typically an amplifier/buffer and an access switch or switches, and, importantly, the sensor (pixel) itself does not store the latest reference signal, neither does it have means to compare to the instantaneous sensor value, nor does it have event generation or event indication capabilities. In reference to event generating image sensors, the present invention enables a smaller pixel size even while using a less advanced manufacturing technology. If an advanced 3D fabrication technology was used, much smaller pixel sizes would be possible as compared to the state of the art.

All the required comparisons and analog-to-digital conversions are provided for multiple sensors/sensor circuits/pixels in a time-multiplexed manner. When implemented with a 2D CMOS fabrication technology, the sensor elements are arranged in an array, and the rest of the circuitry is preferably placed in the periphery outside the sensor array.

In a full-scale analog-to-digital converter (ADC), the analog input signal Ain is converted into N discrete levels, where N is typically a power of two, e.g., N=2^n. For example, in an 8-bit ADC (n=8), N is 256; the ADC result 0 corresponds to a mini-mum analog input value Ain, min, and the ADC result 255 corresponds to a maximum analog input value Ain, max. Ain,max-Ain, min is the full range analog input value that is discretized.

The difference of two analog values Ain and Bin, both with the same full range is maximally (Ain,max-Ain,min)+(Bin,max-Bin,min)=2×(Ain,max-Ain,min). The ana-log-to-digital conversion of the difference thus requires one additional bit for the ADC, compared to only converting one of the inputs. On the other hand, if the difference is smaller than ¼ of (Ain,max-Ain,min), less bits suffice compared to a single input ADC.

In the present invention, the ADC converts the difference of the latest stored reference signal and instantaneous sensor output, and the stored reference is updated based on the ADC result so that the latest stored reference always approaches the instantaneous sensor output. If the ADC process is carried out frequently as compared to the rate of change of the instantaneous sensor signal, the latest stored reference and instantaneous sensor output differ from each other by only a small number of comparison levels (ADC least significant bits). This enables more compact ADC circuitry and faster comparison as compared to carrying out full range ADC operations.

As the ADC is performed only at the vicinity (distance in number of comparison levels is user selectable) of the stored previous reference value, the invention allows to use a more compact ADC (in terms of circuit implementation area) and faster speed of conversion while maintaining monotonic behaviour and accuracy. An example of a guaranteed monotonic ADC is a thermometer ADC, where the signal is successively compared to quantization levels, where each successive level is 1 LSB (least significant bit) apart from the previous comparison. In the present invention, since the difference between the instantaneous and stored values can be either positive or negative, a signed thermometer ADC is preferably used to first determine the sign of the difference and then perform thermometer type successive comparisons to determine the absolute value of the difference. In the present invention, the ADC itself produces the difference information and there is no need for a separate digital comparator. Furthermore, the converted and updated data is readily available for further processing outside of the sensor array.

The downside of limited number of bits in the ADC for converting the difference signal is that with fast, high amplitude changes the latest stored reference signal cannot exactly track the instantaneous sensor output, but lags behind. Both higher ADC sampling speed and higher number of comparison levels improve tracking, and, if properly selected, tracking speed is not an issue.

Figure 2:
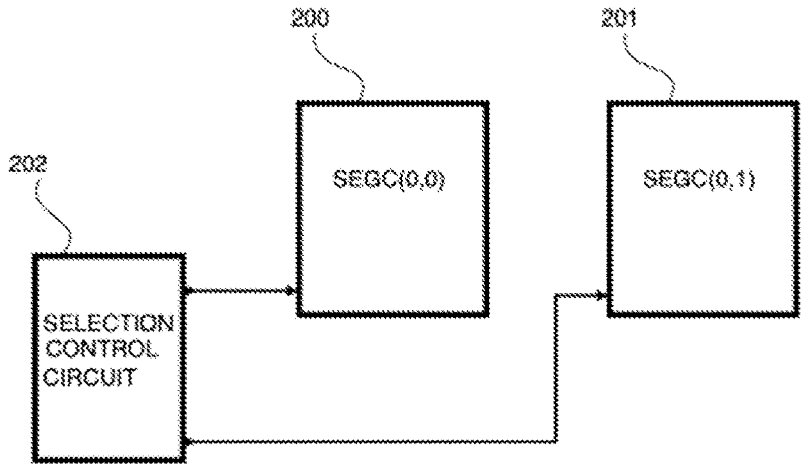
FIG. 2 illustrates a horizontal array of sensor event generation circuits.
Figure 3:
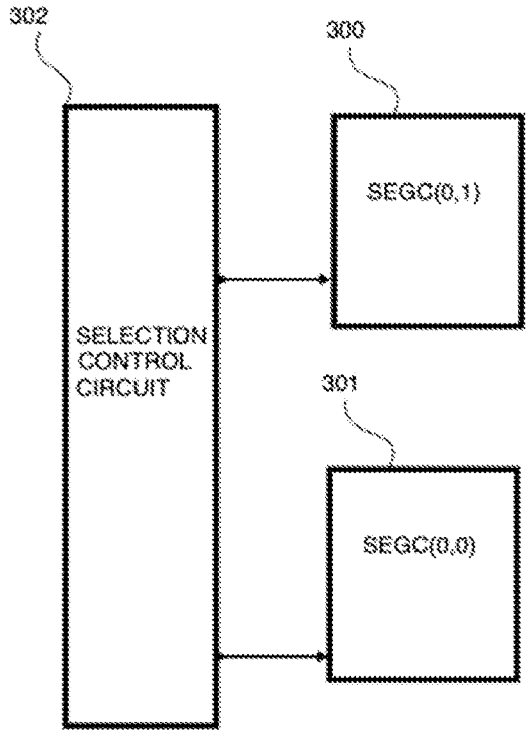
FIG. 3 illustrates a vertical array of sensor event generation circuits.
Figure 4:
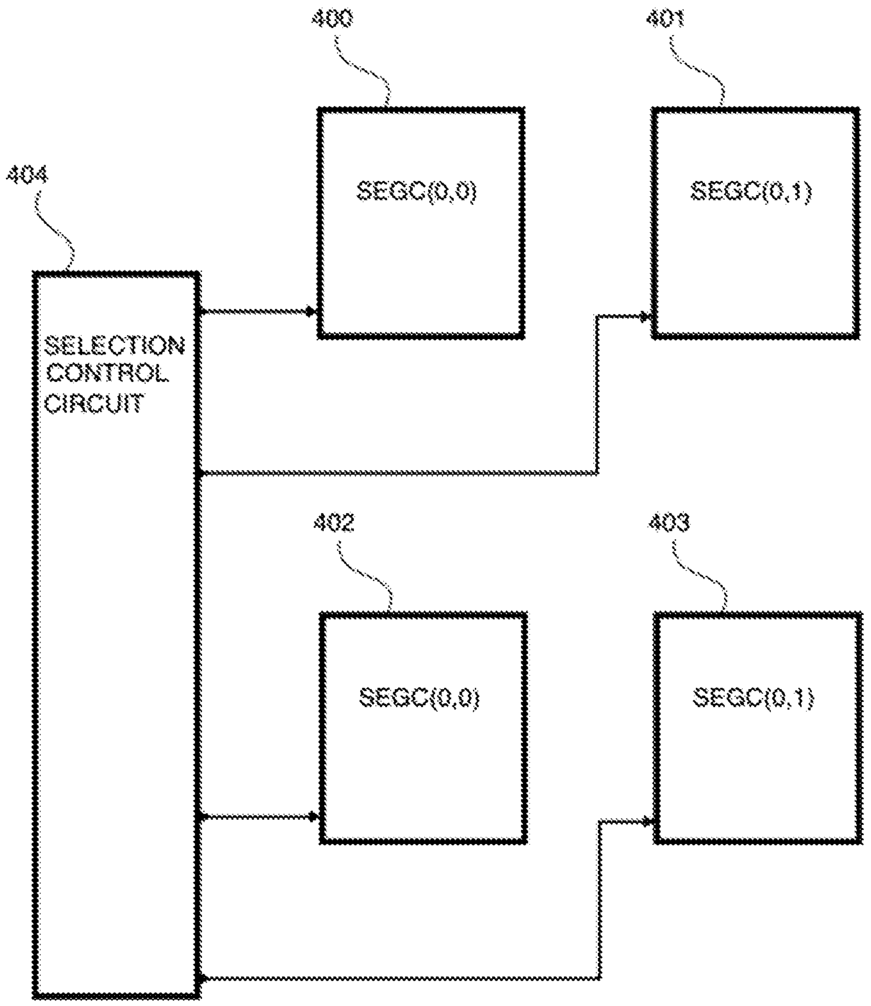
FIG. 4 illustrates a two-dimensional array of sensor event generation circuits.
Figure 5:
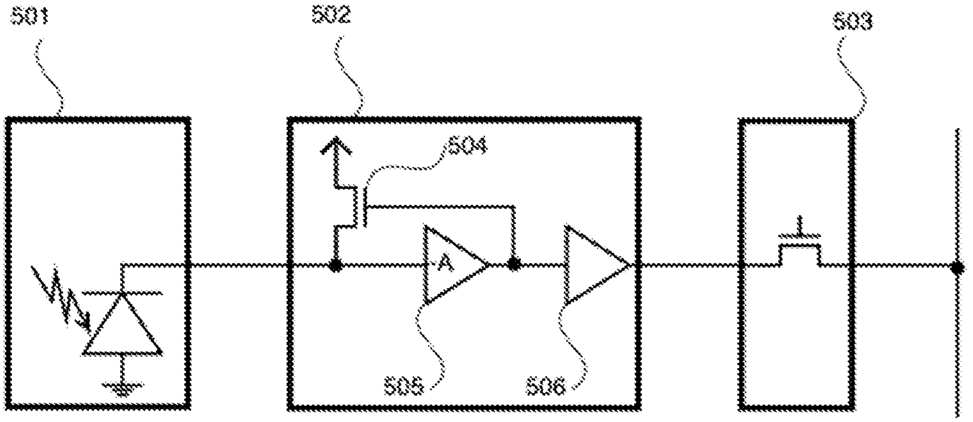
FIG. 5 illustrates a first exemplary circuit that comprises a sensor element, a sensor circuit and a switch.
Figure 6:
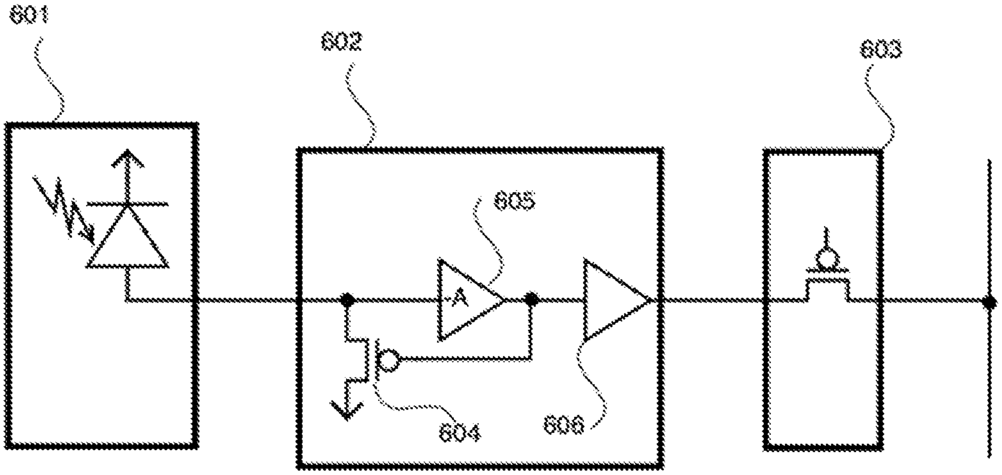
FIG. 6 illustrates a second exemplary circuit that comprises a sensor element, a sensor circuit and a switch.
Figure 7:
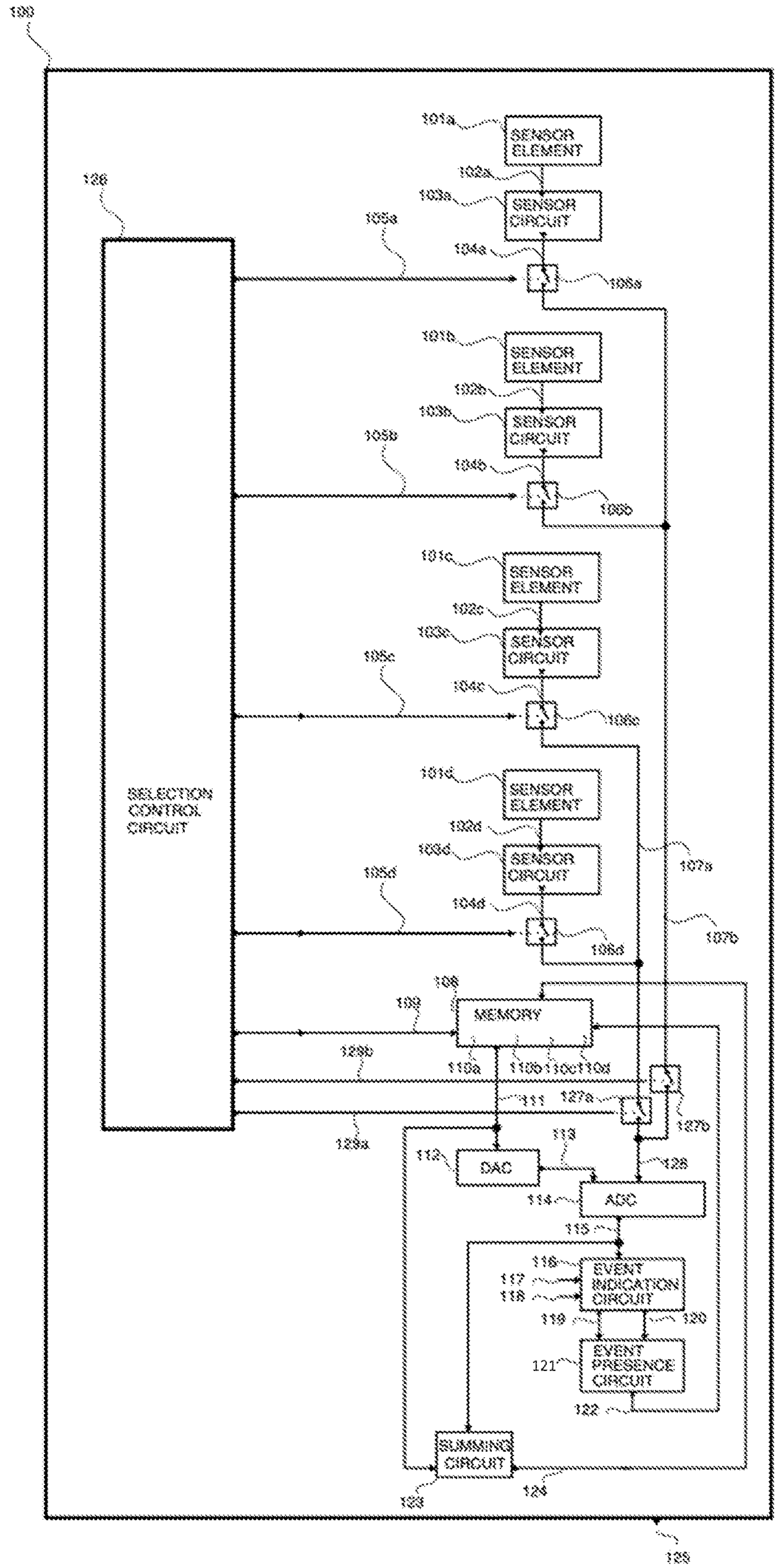
FIG. 7 illustrates a sensor event generation circuit according to a second embodiment of the invention.

Referring to FIGS. 1 and 7, there are illustrated two exemplary implementations of a sensor event generation circuit in accordance with various embodiments of the present invention. FIGS. 2, 3 and 4 are schematic illustrations of sensor event generation systems that employ a plurality of sensor event generation circuits, in accordance with various embodiments of the present invention. FIGS. 5 and 6 illustrate exemplary circuits that comprise a sensor element, a sensor circuit and a switch that can be employed in a sensor event generation circuit according to the invention.

It should be understood by a person skilled in the art that these figures illustrate simplified arrangements of the exemplary implementations of the sensor event generation circuits and sensor event generation systems for the sake of clarity only, which should not unduly limit the scope of the claims herein. Notably, the sensor event generation circuit is not limited to particular physical (topographic) placements of sensor elements, sensor circuits and switches, or number of sensor elements, sensor circuits and switches in the sensor event generation circuit. The person skilled in the art will recognize many variations, alternatives, and modifications of embodiments of the present disclosure.

FIG. 1 illustrates a sensor event generation circuit (SEGC) 100 according to a first embodiment of the invention. The SEGC 100 comprises a first sensor element 101*a* and a second sensor element 101*b*. The sensor elements 101*a* and 101*b* are arranged to receive sensory input in at least one modality, such as light, pressure, touch, olfactory, proximity, sound, or radio frequency. The sensor elements 101*a* and 101*b* are configured to convert the modality to be sensed to an electrical analog signal, the intensity of which depends on the amplitude of the received sensory input. The sensor elements 101*a* and 101*b* can be similar or different, for example they can detect the same or different modality sensory inputs.

The SEGC 100 of FIG. 1 comprises a first sensor circuit 103*a* and a second sensor circuit 103*b*. The first sensor circuit 103*a* is arranged to receive the electrical analog signal from the first sensor element 101*a* via a wire 102*a* and to convert the received electrical analog signal to a first electrical analog (output) signal that is suitable to be received and converted to digital form using an analog-to-digital converter (ADC) 114. The first electrical analog signal can be a result of any combination of operations, for example: amplification, a linear function, a nonlinear function, buffering, direct connection from input to output, no connection from input to output, and selection of input (in case multiple sensor elements are attached to the sensor circuit). Similarly, the second sensor circuit 103*b* is arranged to receive the electrical analog signal from the second sensor element 101*b* via a wire 102*b* and to convert the received electrical analog signal into a second electrical analog (output) signal that is suitable to be received by the ADC 114. In another embodiment, there can be multiple sensor elements per one sensor circuit.

The SEGC 100 of FIG. 1 comprises a first switch 106*a* and a second switch 106*b*. The first switch 106*a* is electrically connected to the first sensor circuit 103*a* with a wire 104*a* and to the ADC 114 with a wire 107. The second switch 106*b* is electrically connected to the second sensor circuit 103*b* with a wire 104*b* and to the ADC 114 with the wire 107. The first switch 106*a* is arranged so that the first switch 106*a* can be selectively closed to electrically connect the first sensor circuit 103*a* to the ADC 114, or selectively opened to electrically disconnect the first sensor circuit 103*a* from the ADC 114. The selection is controlled by a first selection control signal received from a selection control circuit 126 via a wire 105*a*. Similarly, the second switch 106*b* is arranged so that the second switch 106*b* can be selectively closed to electrically connect the second sensor circuit 103*b* to the ADC 114, or selectively opened to electrically disconnect the second sensor circuit 103*b* from the ADC 114. The selection is controlled by a second selection control signal received from the selection control circuit 126 via a wire 105*b*. The selection control circuit 126 is arranged to control the operation of the first switch 106*a* and the second switch 106*b* so that only one of the switches 106*a*, 106*b* can be in a closed state (conducting) at a time. However, in some use scenarios multiple switches can be conducting at the same time. For example, if the sensor signal is in current mode, multiple sensor signals could be summed by closing multiple switches at a time. This is an example analog computing on the wire 107. There are various other analog compute operations that could be carried out on the wire 107, for example charge-based sum/average operation that could be used in pixel binning.

The SEGC 100 of FIG. 1 comprises a state value digital memory 108 having a first digital state memory 110*a* for storing a first digital state value and a second digital state memory 110*b* for storing a second digital state value. The selection control circuit 126 is arranged to control the state value digital memory 108 to select the first digital state memory 110*a* when the first switch 106*a* is in the closed state or the second digital state memory 110*b* when the second switch 106*b* is in the closed state. The selection is controlled by a state selection control signal received from the selection control circuit 126 via a wire 109.

The digital memory is preferably implemented as single or multi-bit digital dynamic memory, or static digital memory, or nonvolatile digital memory. In large implementations the amount of digital memory required is large, so a memory implementation that has a compact (low die area) implementation is preferred. Typically, the state value digital memory has space to store as many digital state values as there are sensor (pixel) elements in the SEGC, but there could be more or less storage space in the state value digital memory as compared to the number of sensor elements.

The SEGC 100 of FIG. 1 comprises a digital-to-analog converter (DAC) 112 that is electrically connected to the state value digital memory 108 with a wire 111. The DAC 112 is arranged to receive the digital state value stored in the selected digital state memory 110*a* or 110*b* and to convert the digital state value to a previous state analog value.

In one embodiment, the reference levels for the DAC 112 can be generated using a resistor string. The benefit of using a resistor string DAC is that it is inherently monotonic. In case there are multiple DACs in the system, it is possible to use one resistor string for generating reference values for the multiple DACs, and thus save in die area, power consumption, but also guarantee the same uniform references for all associated DACs. The DAC reference levels can be arranged to adapt to global changes in a sensor signal. For example, if the sensor event generation circuit is used for image capture in an environment where the ambient illumination is dominated by flickering light sources, the global change in the ambient illumination generates unwanted changes in the signal and may induce events for pixels all over the array. To reduce these unwanted events resulting from the ambient signal changes, there needs to be means to measure the typically periodic ambient signal. Once the profile of the ambient signal is known, the DAC reference can be adjusted to counteract. Typically, when ambient signal level is high, the DAC reference levels should be increased, and when ambient signal level is low, the DAC reference levels should be decreased. Ideally, periodic changes in ambient signal are fully compensated by adjusting the DAC reference levels.

The ADC 114 is arranged to receive the previous state analog value from the DAC 112 via a wire 113 and to receive one of the electrical analog signals via the wire 107 and to convert the difference of the electrical analog signal and the previous state analog value to a difference digital value. Noting that the ADC 114 is converting the difference of the electrical analog signal and the previous state analog value, and assuming the sampling rate of the ADC 114 is fast enough as compared to the rate of change of the analog line signal, it can be assumed that a small number of bits is sufficient in the ADC 114. Typically, if the number of bits (and comparison levels) in the ADC 114 is small enough, for example, 4 bits, yielding 16 comparison levels, it is possible to use a thermometer-coded ADC, which is known to yield a monotonic conversion result and provides easy means to control the number of consecutive comparison levels up to a maximum supported comparison level. One source of error in an ADC is that typically the ADC samples the input signal before conversion. Sampling an electrical analog signal is associated with different nonidealities, like thermal noise and charge injection.

In one embodiment of the invention, the ADC 114 does not sample the signal, but rather uses an unsampled electrical analog signal value directly for the ADC 114.

It is possible to change the number of comparisons carried out in the ADC 114. For example, if it takes too much time to sample 16 comparison levels, it is possible to sample e.g., 8 comparison levels. The comparison results are usable despite of the smaller number of comparison levels, but it slows down the speed at which the previous state analog value tracks the sensor analog line signal. For example, using as little as three comparison levels, −1, 0, 1, where these numbers correspond to number of LSBs, is possible.

The SEGC 100 of FIG. 1 comprises an event indication circuit 116 that is arranged to receive the difference digital value from the ADC 114 via a wire 115. The event indication circuit 116 is used to determine whether the difference digital value is above a positive threshold 117 and in case the comparison result is true, assert a positive event indication signal, and to determine whether the difference digital value is below a negative threshold 118 and in case the comparison result is true, assert a negative event indication signal. When the above-described comparisons are false, the corresponding event indication signal becomes deasserted. For example, if the difference digital value is below the positive threshold 117, the positive event indication signal is deasserted. The positive threshold 117 and the negative threshold 118 can be controlled and changed in steps of one LSB. It should be noted that this is different as compared to changing the ADC LSB size, the size of which is an analog value and can be adjusted in an unquantized manner.

The SEGC 100 of FIG. 1 comprises an event presence circuit 121 that is electrically connected to the event indication circuit 116 with wires 119 and 120. The event presence circuit 121 is arranged to assert an event presence signal if either the positive event indication signal or the negative event indication signal has been received. The positive event indication signal is received via the wire 119, and the negative event indication signal is received via the wire 120. The event presence circuit 121 can be implemented using digital logic. The event presence signal is conveyed to the state value digital memory 108 via a wire 122.

The SEGC 100 of FIG. 1 comprises a summing circuit 123 that is electrically connected to the ADC 114 and the state value digital memory 108. The summing circuit 123 is arranged to receive the difference digital value and the digital state value stored in the selected digital state memory **110*a* or 110*b*, to sum the difference digital value with the digital state value and to produce a summing result. The summing result is arranged to be written to the selected digital state memory 110*a* or 110*b* if the event presence signal has been asserted. The summing result is conveyed to the state value digital memory 108 via a wire 124. There are various ways to implement the summing circuit 123**. Two exemplary alternatives are that the summing circuit is an adder circuit, or alternatively it could be based on a counter circuit. The counter-based summing has a convenient implementation when a thermometer coded ADC is used. Event indication could disable the counter that has been loaded to an initial value determined by the digital memory output before the ADC starts, and while not disabled during the ADC, the counter would either increase or de-crease by one according to the thermometer conversion each time a new introduced comparison level does not produce an event.

The SEGC 100 of FIG. 1 has means to select and conditionally write the summing result to the first digital state memory **110*a* within the state value digital memory 108, and means to select and conditionally write the summing result to the second digital state memory 110*b* within the state value digital memory 108, with the selection controlled by the state selection control signal received from the selection control circuit 126 and conditional write controlled by the event presence signal. In another embodiment, the summing result can be written to any location in the state value digital memory 108. The conditional write controlled by the event presence signal means that if there is an event present, the event presence signal is asserted, and the summing result is written to a location in the state value digital memory 108. If the event presence signal is not asserted, the summing result is not written to the state value digital memory 108. In many digital memory arrangements, it is mandatory to write some value to a memory when a whole row of the memory is accessed simultaneously. In these cases, it is not possible to skip the writing of those memories where the event presence signal is not asserted. However, in these cases, the digital memory output, read before the ADC sequence, can be written back to the digital state memory 108**.

The SEGC 100 of FIG. 1 also has means to output one or more data types, for example the digital state value, the difference digital value, the positive event indication signal, the negative event indication signal, the event presence signal, or the summing result from the SEGC 100 and provide one or more data types for a readout 125. Depending on the application, different combination of data types can be arranged for the readout 125 from the SEGC 100.

The selection control circuit 126 contains means to control selection by using the control signals. There can be one selection control circuit, or the selection control circuit can comprise a plurality of separate circuit blocks. The selection control circuit 126 is responsible for providing the DAC 112 the correct digital state memory content at each time so that the correspondence of the previous sensor signals and the sensor signal that is under evaluation is preserved. For example, the selection control circuit 126 can be a decoder or a shift register. One common example is an array row selection circuit that generates a row pointer in a pixel array or memory array pointer.

FIG. 7 illustrates a sensor event generation circuit (SEGC) 100 according to a second embodiment of the invention. The SEGC of FIG. 7 differs from the SEGC of FIG. 1 as follows.

The SEGC 100 of FIG. 7 further comprises a third sensor element 101*c* and a fourth sensor element 101*d*. The sensor elements 101*c* and 101*d* are arranged to receive sensory input in at least one modality such as light, pressure, touch, olfactory, proximity, sound, or radio frequency. The sensor elements 101*c* and 101*d* are configured to convert the modality to be sensed to an electrical analog signal, the intensity of which depends on the amplitude of the received sensory input. The sensor elements 101*a*, 101*b*, 101*c* and 101*d* can be similar or different, for example they can detect the same or different modality sensory inputs.

The SEGC 100 of FIG. 7 further comprises a third sensor circuit 103*c* and a fourth sensor circuit 103*d*. The third sensor circuit 103*c* is arranged to receive the electrical analog signal from the third sensor element 101*c* via a wire 102*c* and to convert the received electrical analog signal to a third electrical analog (output) signal that is suitable for the ADC 114. Similarly, the fourth sensor circuit 103*d* is arranged to receive the electrical analog signal from the fourth sensor element 101*d* via a wire 102*d* and to convert the received electrical analog signal into a fourth electrical analog (output) signal that is suitable for the ADC 114.

The SEGC 100 of FIG. 7 further comprises a third switch 106*c* and a fourth switch 106*d*. The third switch 106*c* is electrically connected to the third sensor circuit 103*c* with a wire 104*c*, and the fourth switch 106*d* is electrically connected to the fourth sensor circuit 103*d* with a wire 104*d*. The operation of the third switch 106*c* is controlled with a third selection control signal received from the selection control circuit 126 via a wire 105*c*. Similarly, the operation of the fourth switch 106*d* is controlled with a fourth selection control signal received from the selection control circuit 126 via a wire 105*d*.

The SEGC 100 of FIG. 7 further comprises a fifth switch 127*b* that is electrically connected to the first switch 106*a* and the second switch 106*b* via a wire 107*b* and to the ADC 114 via a wire 128, and a sixth switch 127*a* that is electrically connected to the third switch 106*c* and the fourth switch 106*d* via a wire 107*a* and to the ADC 114 via the wire 128. The operation of the fifth switch 127*b* is controlled with a fifth selection control signal received from the selection control circuit 126 via a wire 129*b*. Similarly, the operation of the sixth switch 127*a* is controlled with a sixth selection control signal received from the selection control circuit 126 via a wire 129*a*.

The selection control circuit 126 is arranged to control the operation of the third switch 106*c* and the fourth switch 106*d* so that only one of the switches 106*c* and 106*d* can be in a closed state at a time, and to control the operation of the fifth switch 127*b* and the sixth switch 127*a* so that only one of the fifth and sixth switches 127*a* and 127*b* can be in a closed state at a time. The state value digital memory 108 has a third digital state memory 110*c* for storing a third digital state value and a fourth digital state memory 110*d* for storing a fourth digital state value. The selection control circuit 126 is arranged to control the state value digital memory 108 to select the first digital state memory 110*a* when the first switch 106*a* and the fifth switch 127*b* are in the closed state, the second digital state memory 110*b* when the second switch 106*b* and the fifth switch 127*b* are in the closed state, the third digital state memory 110*c* when the third switch 106*c* and the sixth switch 127*a* are in the closed state, or the fourth digital state memory 110*d* when the fourth switch 106*d* and the sixth switch 127*a* are in the closed state.

In the SEGC 100 of FIG. 7, the fifth switch 127*b* and the sixth switch 127*a* are controlled by selection control signals, i.e. the fifth and sixth selection control signals, to select one sensor analog line signal to be connected to the ADC 114. Such arrangement may be beneficial for speeding up the reading of sensor analog line signals to the ADC, and thus speed up the operation as a whole. The idea can be expanded so that the ADC has more than two sensor analog line signals.

In some use scenarios multiple switches can be conducting at the same time. For example, if the sensor signal is in current mode, multiple sensor signals could be summed by closing multiple switches at a time. This is an example analog computing on the wire 107*a* and/or 107*b*. There are various other analog compute operations that could be carried out on the wire 107*a* and/or 107*b*, for example charge-based sum/average operation that could be used in pixel binning.

In a 2D integrated circuit fabrication technology the number of sensor elements, sensor circuits and switches are generally much larger than two per ADC, because of physical layout constraints. On the other hand, 3D integrated circuit fabrication technology makes it possible to use more ADCs per sensor element, thus speeding up the operation.

FIGS. 2, 3 and 4 illustrate various examples of a sensor event generation system that comprises a plurality of sensor event generation circuits (SEGC). In FIG. 2, there is shown a horizontal array of SEGCs 200 and 201. A selection control circuit 202 is used to control the selection in the SEGCs 200 and 201 by using control signals. In FIG. 3, there is shown a vertical array of SEGSs 300 and 301. A selection control circuit 302 is used to control the selection in the SEGCs 300 and 301 by using control signals. In FIG. 4, there is shown a two-dimensional array of SEGSs 400, 401, 402 and 403. A selection control circuit 404 is used to control the selection in the SEGCs 400, 401, 402 and 403 by using control signals.

Different topological arrangements can be used, for example in an image sensor (event camera) wherein one sensor event generation circuit could yield a column of pixels, and multiple of these in parallel would yield an array of pixels. On the other hand, more than one SEGC per column could yield faster operation.

FIG. 5 illustrates a first exemplary circuit that comprises a sensor element 501, a sensor circuit 502 and a switch 503. The sensor element 501 is a photodiode but it could be another type of photosensor device or a sensor for sensing a modality other than light. The sensor circuit 502 comprises a regulating NMOS transistor 504 and an inverting amplifier 505, wherein the source of the regulating NMOS transistor 504 is electrically connected to the cathode of the photodiode and to the input of the inverting amplifier 505. The anode of the photodiode is typically connected to an operating voltage. The drain of the regulating NMOS transistor 504 is electrically connected to the operating voltage, and the gate of the regulating NMOS transistor 504 is connected to the output of the inverting amplifier 505. The inverting amplifier 505 is typically arranged to produce essentially a logarithmic output. The output of the inverting amplifier 505 is connected to a buffer 506, the output of which is connected to the switch 503.

It should be noted that in a different embodiment, the transistor 504 could be a PMOS transistor or a totally different sensor circuit. For example, in another embodiment, the transistor 504 could be PMOS, bipolar, JFET transistor, or any other transistor-like device or circuit. Similarly, the switch 503 could be an NMOS transistor or PMOS transistor, bipolar transistor or another device or circuit that can be used as a switch. The main thing is that the sensor circuit 502 can produce a valid signal (signal that corresponds to the magnitude of the modality being sensed) when it is read.

FIG. 6 illustrates a second exemplary circuit that comprises a sensor element 601, a sensor circuit 602 and a switch 603. The sensor element 601 is a photodiode. The sensor circuit 602 comprises a regulating PMOS transistor 604 and an inverting amplifier 605, wherein the source of the regulating PMOS transistor 604 is electrically connected to the anode of the photodiode and to the input of the inverting amplifier 605. The cathode of the photodiode is typically connected to an operating voltage. The drain of the regulating PMOS transistor 604 is electrically connected to the operating voltage, and the gate of the regulating PMOS transistor 604 is connected to the output of the inverting amplifier 605. The inverting amplifier 605 is typically arranged to produce essentially a logarithmic output. The output of the inverting amplifier 605 is connected to a buffer 606, the output of which is connected to the switch 603.

Being computer-related, it can be appreciated that the components disclosed herein may be implemented in hardware, software, or a combination of hardware and software. Software components may be in the form of computer-readable program code stored in a computer-readable storage medium such as memory, mass storage device, or removable storage device. For example, a computer-readable medium may comprise computer-readable code for performing the function of a particular com-ponent. Likewise, computer memory may be configured to include one or more components, which may then be executed by a processor. Components may be implemented separately in multiple modules or together in a single module.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A sensor event generation circuit, comprising:

a first sensor circuit arranged to provide a first electrical analog signal, and a first switch connected to the first sensor circuit and arranged to receive the first electrical analog signal, a second sensor circuit arranged to provide a second electrical analog signal, and a second switch connected to the second sensor circuit and arranged to receive the second electrical analog signal, and a selection control circuit arranged to control the operation of the first switch and the second switch so that only one of the first and second switches can be in a closed state at a time, wherein the sensor event generation circuit comprises:

a state value digital memory having a first digital state memory for storing a first digital state value and a second digital state memory for storing a second digital state value, wherein the selection control circuit is arranged to control the state value digital memory to select the first digital state memory when the first switch is in the closed state or the second digital state memory when the second switch is in the closed state, a digital-to-analog converter connected to the state value digital memory and arranged to receive the digital state value stored in the selected digital state memory and to convert the digital state value to a previous state analog value, an analog-to-digital converter connected to the first switch, the second switch and the digital-to-analog converter and arranged to receive the previous state analog value and one of the electrical analog signals and to convert the difference of the electrical analog signal and the previous state analog value to a difference digital value, an event indication circuit connected to the analog-to-digital converter and arranged to receive the difference digital value and to determine whether the difference digital value is above a positive threshold and in such case assert a positive event indication signal, and to determine whether the difference digital value is below a negative threshold and in such case assert a negative event indication signal, an event presence circuit connected to the event indication circuit and arranged to assert an event presence signal if either the positive event indication signal or the negative event indication signal has been received, and a summing circuit connected to the analog-to-digital circuit and the state value digital memory and arranged to receive the difference digital value and the digital state value stored in the selected digital state memory, to sum the difference digital value with the digital state value and to produce a summing result, wherein the summing result is arranged to be written to the selected digital state memory if the event presence signal has been asserted.

2. The sensor event generation circuit according to claim 1, wherein the sensor event generation circuit comprises:

a third sensor circuit arranged to provide a third electrical analog signal, and a third switch connected to the third sensor circuit and arranged to receive the third electrical analog signal, a fourth sensor circuit arranged to provide a fourth electrical analog signal, and a fourth switch connected to the fourth sensor circuit and arranged to receive the fourth electrical analog signal, a fifth switch connected between the first and second switches and the analog-to-digital converter, and a sixth switch connected between the third and fourth switches and the analog-to-digital converter, wherein the selection control circuit is arranged to control the operation of the third switch and the fourth switch so that only one of the third and fourth switches can be in a closed state at a time, and to control the operation of the fifth switch and the sixth switch so that only one of the fifth and sixth switches can be in a closed state at a time and wherein the state value digital memory has a third digital state memory for storing a third digital state value and a fourth digital state memory for storing a fourth digital state value, wherein the selection control circuit is arranged to control the state value digital memory to select the first digital state memory when the first switch and the fifth switch are in the closed state, the second digital state memory when the second switch and the fifth switch are in the closed state, the third digital state memory when the third switch and the sixth switch are in the closed state, or the fourth digital state memory when the fourth switch and the sixth switch are in the closed state.

3. The sensor event generation circuit according to claim 1, wherein the sensor event generation circuit comprises output means for outputting one or more of the following: the digital state value, the difference digital value, the positive event indication signal, the negative event indication signal, the event presence signal, or the summing result.

4. The sensor event generation circuit according to claim 1, wherein the analog-to-digital converter is a thermometer analog-to-digital converter.

5. The sensor event generation circuit according to claim 1, wherein the positive and negative thresholds are defined in terms of number of least significant bits, which are adjustable.

6. The sensor event generation circuit according to claim 2, wherein each of the first sensor circuit, the second sensor circuit, the third sensor circuit, and the fourth sensor circuit comprises a sensor element or is connected to a sensor element.

7. The sensor event generation circuit according to claim 6, wherein the sensor element of the first sensor circuit, the second sensor circuit, the third sensor circuit, and the fourth sensor circuit is a photodiode.

8. The sensor event generation circuit according to claim 7, wherein the sensor circuit comprises a regulating transistor and an inverting amplifier, wherein the source of the regulating transistor is connected to the cathode of the photodiode and the input of the inverting amplifier, the drain of the regulating transistor is connected to an operating voltage and the gate of the regulating transistor is connected to the output of the inverting amplifier, wherein the inverting amplifier is arranged to produce essentially a logarithmic output.

9. The sensor event generation circuit according to claim 7, wherein the sensor circuit comprises a regulating transistor and an inverting amplifier, wherein the source of the regulating transistor is connected to the anode of the photodiode and the input of the inverting amplifier, the drain of the regulating transistor is connected to an operating voltage and the gate of the regulating transistor is connected to the output of the inverting amplifier, wherein the inverting amplifier is arranged to produce essentially a logarithmic output.

10. The sensor event generation circuit according to claim 1, wherein the sensor event generation circuit has been manufactured using 3D integration technology, wherein the building blocks of the sensor event generation circuit are physically located in a least two semiconductor substrates.

11. The sensor event generation circuit according to claim 1, wherein the analog-to-digital converter uses an unsampled electrical analog signal value as an input to the analog-to-digital converter.

12. A sensor event generation system, wherein the sensor event generation system comprises at least two sensor event generation circuits according to claim 1.

13. The sensor event generation system according to claim 12, wherein the digital-to-analog converters in the at least two sensor event generation circuits are arranged to use shared analog references.

14. The sensor event generation system according to claim 12, wherein the digital-to-analog converters in the at least two sensor event generation circuits are arranged to use analog references that are arranged to counteract periodic global changes in an ambient sensor signal.

* * * * *